United States Patent [19]

Greider et al.

[11] Patent Number: 4,648,238

[45] Date of Patent: Mar. 10, 1987

[54] REMOVABLE GRASS CATCHER

[75] Inventors: C. Austin Greider, Des Moines; David G. Stephenson, Urbandale; Terry R. Lee, Des Moines; John R. Durfee, Ankeny, all of Iowa

[73] Assignee: Western International, Inc., Des Moines, Iowa

[21] Appl. No.: 712,848

[22] Filed: Mar. 18, 1985

[51] Int. Cl.⁴ .......................................... A01D 35/22
[52] U.S. Cl. ...................................... 56/202; 56/16.6
[58] Field of Search ................. 56/13.4, 16.6, 202, 56/320.2

[56] References Cited
U.S. PATENT DOCUMENTS 4,173,111  11/1979  Peterson ............................... 56/202
4,250,698   2/1981  Pappalardo et al. ................... 56/202
4,312,176   1/1982  Bollinger et al. ..................... 56/202
4,393,645   7/1983  Moore .................................. 56/202

Primary Examiner—Gene Mancene
Assistant Examiner—David I. Tarnoff
Attorney, Agent, or Firm—G. Brian Pingel; Kent A. Herink

[57] ABSTRACT

A removable grass catcher for a rotary lawn mower that includes a relatively rigid housing for the collection of grass clippings. The housing includes a top wall with at least one downwardly extending flange, at least a part of which top wall is spaced apart from the upper edges of at least one of the rear and side walls of the housing to provide air gaps therebetween that serve as air vents for the housing during the accumulation of grass clippings therein.

5 Claims, 5 Drawing Figures

REMOVABLE GRASS CATCHER

BACKGROUND OF THE INVENTION

1. Field of the Invention

The present invention relates to a removable grass catcher for a rotary lawn mower or the like, and more particularly to such a catcher that has upper side air vents formed to direct exhausted air in a downwardly direction.

2. Description of the Prior Art

Grass collection containers for rotary lawn mower controlled by an operator walking behind the mower are generally of a flexible cloth bag or a rigid housing formed from molded plastic or the like. The rigid molded catcher suffers primarily from the disadvantage that vent holes must be formed in the catcher to serve as exhaust ports for air that is forced into the catcher along with grass clippings.

The problem with venting in rigid catchers is that the vents must be formed in such fashion so as to permit efficient venting of the air from the catcher and yet, at the same time, substantially minimize the escape of any grass clippings therefrom. A number of rigid catchers have been devised to overcome this disadvantage through a unique positioning of air vents and the use of baffles to block the passage of grass clippings through the vents. For example, such a catcher is described in U.S. Pat. No. 4,250,698 which issued Feb. 17, 1981. Although the invention described in the "698" patent appears to provide an efficient and effective venting system, it is believed that the structure of such device is needlessly complicated and would be unreasonably expensive to manufacture.

The present invention provides a substantially rigid, molded grass catcher of a simplistic and yet efficient and effective design for providing venting of the catcher with minimal loss of grass clippings from the catcher.

SUMMARY OF THE INVENTION

The present invention provides a removable grass catcher for a rotary lawn mower that is formed from a relatively rigid housing having air vents formed by the side and top walls of the housing. The housing defines an interior cavity having an inlet opening at one end adapted to be positioned in registration with the discharge opening of the lawn mower for receiving an accumulation of grass clippings in the cavity.

The top wall of the housing is formed of a major portion that defines the ceiling of the cavity and a downwardly extending peripheral flange along at least one of the rear and side edges of the major portion. At least a part of the major portion of the housing top and the flange are spaced apart from the upper edge portions of at least one of the rear and side walls of the housing adjacent to the flange of the top wall to provide an air gap therebetween that serves as an air vent for the housing during the accumulation of grass clippings therein.

DETAILED DESCRIPTION OF THE PREFERRED EMBODIMENT

Figure 1:
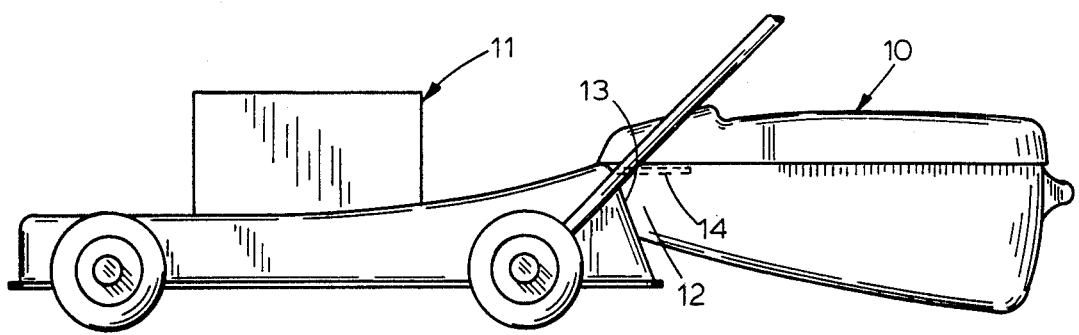
FIG. 1 is a front, side elevational view on a reduced scale, of a rotary lawn mower on which is attached a rigid grass catcher of the present invention.

Referring now to the drawings and with reference first to FIG. 1, a molded plastic grass catcher 10 of the present invention is shown in association with a rotary lawn mower 11 adapted to be controlled by an operator that walks behind the mower. As is well known in the art, the catcher 10 is semi-permanently attached to the rear of the lawn mower 11 by standard attachment means and is positioned relative to the mower 11 with its inlet end 12 in registry with a discharge opening 13 of the mower 11 so as to receive grass clippings and air that have been forced through such opening.

Also shown in dotted lines in FIG. 1, is a safety plate 14 that is pivotably mounted over the discharge opening 13. When the catcher 10 is not attached to the mower 11, the safety plate 14 is in a closed position preventing grass clippings or other materials from being discharged from the opening 13. The pivotable mounting of the plate 14 is fashioned such that when the catcher 10 is attached to the mower 11, the safety plate 14 is pivoted into an open position as seen in FIG. 1, so that it extends into the catcher 10 as indicated in FIG. 1 thereby permitting the passage of grass clippings and air through the opening 13.

Figure 2:
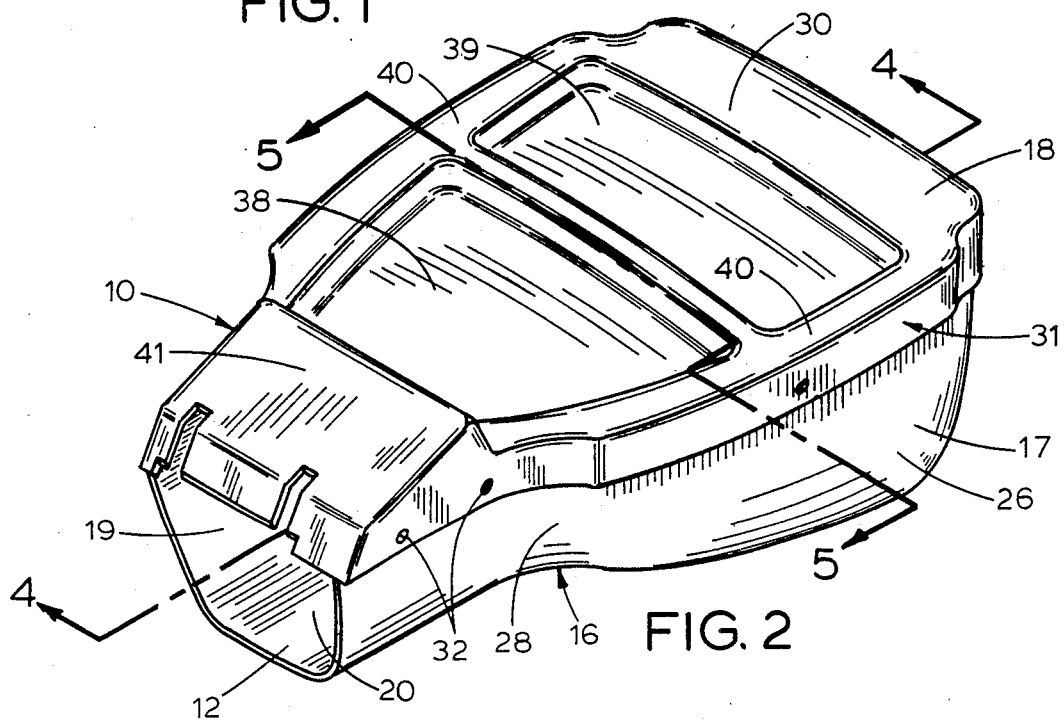
FIG. 2 is a side perspective view of the grass catcher of FIG. 1.

The catcher 10 is adapted to be used in conjunction with all types of rear discharge rotary mower for receiving and accumulating grass clippings produced by the mower as it is traversed across a lawn. Referring now to FIG. 2, the grass catcher 10 is composed of a suitable moldable plastic forming a two-piece housing 16 that includes a lower section 17 and an upper lid section 18. The housing sections 17 and 18 define an interior cavity 19 having an inlet opening 20 at the inlet end 12 which, as described above, is in registry with the discharge opening 13 of the mower 11. Thus, the grass clippings from the mower 11 are blown through the discharge opening 13, through the inlet opening 20 into the interior cavity 19 of the housing 16 where they are accumulated and stored until the catcher 10 is emptied.

Figure 3:
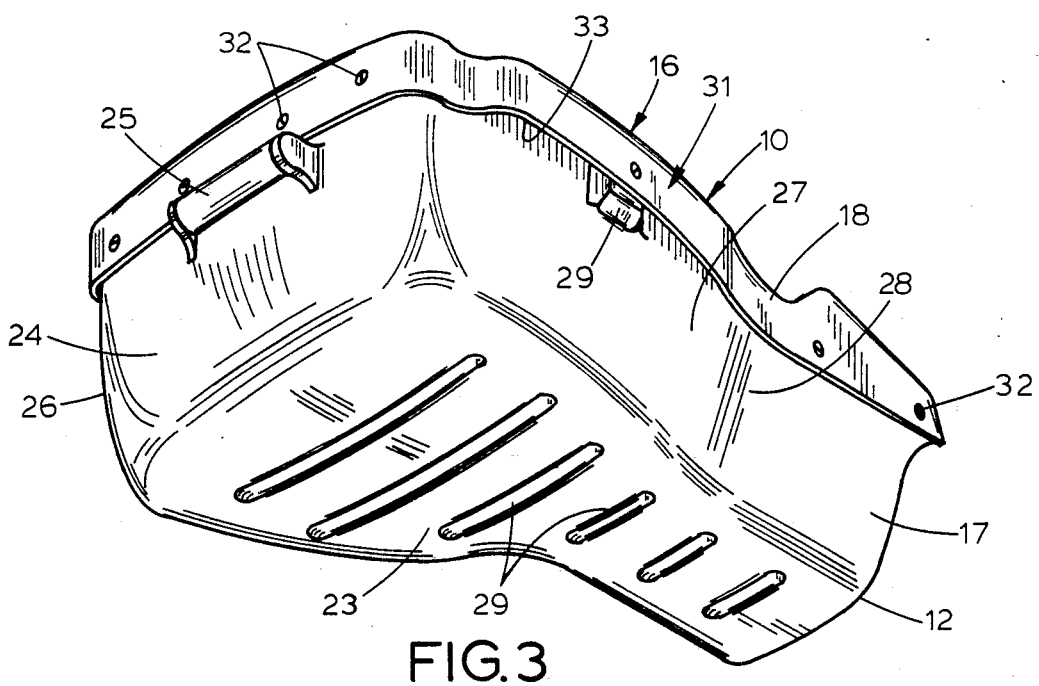
FIG. 3 is a rear, side perspective view of the grass catcher of FIG. 1.

Referring now to both FIGS. 2 and 3, the lower housing section 17 includes a bottom wall 23, rear wall 24 on which a handle 25 is secured, and opposite side walls 26 and 27, shown respectively in FIGS. 2 and 3. As can clearly be seen from FIGS. 2 and 3, the side walls 26 and 27 are not formed in a straight configuration but are slanted inwardly as at 28 to form the inlet end 12 in a necked-down fashion in association with the bottom wall 23 and the upper section 18. For strenghtening purposes, transverse ribs 29 extended substantially across the width of the bottom wall 23 of the section 17. Each of the side walls 26 and 27 is formed with a lug 29 (shown only in FIG. 3) near its upper edge for a purpose to be described below.

As best shown in FIG. 2, the housing upper lid section 18 is substantially formed by a top surface 30 that defines the ceiling of the cavity 19. The lid section has a downwardly extended peripheral flange 31 that preferably extends along the rear and side edges of the surface 30. The flange 31 and top surface 30 have a slanted in configuration similar to that of the lower portion 17 so that when the portion 17 is placed upon the portion 18, the two portions will substantially conform together to define the housing 16.

Figure 5:
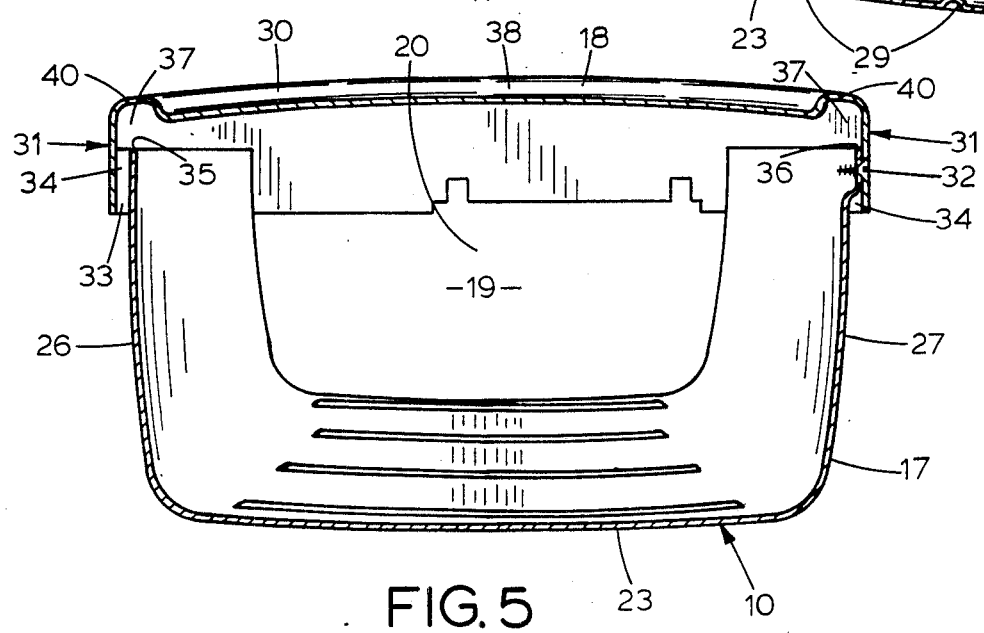
FIG. 5 is a cross sectional view of the grass catcher of FIG. 1 taken along the line 5—5 of FIG. 2.

When the sections 17 and 18 are joined together, as by screws 32, the flange 31 is adapted to abut against the rear wall 24 and the front and rear portions of the side walls 26 and 27. However, as indicated in FIGS. 2 and 5, the medial side portions of the flange 31 are spaced apart from the side walls 26 and 27. This is caused by the width of the medial portion of the top surface 30 being greater than the distance between the side walls 26 and 27, as can best be seen in FIG. 5. Thus, there are gaps 33 between the medial side portions of the flange 31 and the side walls 26 and 27 to provide an air vent 34 for each side of the housing 16 as will be further described below.

For most efficient grass collection, it is preferrable that the catcher 10 only utilize side venting on each side as described above. However, it should be clear to those skilled in the art that the concept of the present invention can be utilized to also provide venting at only one side, venting at only the rear, or venting at both the sides and the rear of the housing 16.

As shown in FIG. 5, it is also preferrable that when the lower and upper section 17 and 18 of the housing 16 are assembled together, as by the screws 32 or other such attachment means, the lower face of the top surface 30 is spaced above the upper edges 35 and 36 of the side walls 26 and 27 respectively to provide air gaps 37 therebetween. The air gaps 37 communicate with the air gaps 33 between the flange 31 and the side walls 26 and 27, to form the air vents 34 for the housing 16. The air vents 34 are, thus, formed near the top of the housing 16 in a position away from the flow of grass clippings as they are discharged into the catcher 10. As a result of this upper positioning of the air vents 34 and also their position on the sides of the catcher 10, substantially all of the grass clippings that are discharged into the catcher interior 19 remain there and few escape through the air vents 34.

As shown in FIGS. 2 and 5, the top surface of the upper section 18 is substantially formed of two recessed areas 38 and 39 that extend almost the entire width between the side walls 26 and 27. As best shown in FIG. 5, the termination of the recessed portions 38 and 39 results in a peripheral ridge 40 along each side of the top surface 30 to thus enlarge the air gaps 37 between the top surface 30 and the upper edges 35 and 36 of the side walls 26 and 27 respectively. In this way, the shape of the air gaps 37 promotes the flow of air through the air vents 34.

From the above description, it should be recognized by those skilled in the art that it is not essential to have the top surface 30 of the upper section 18 positioned above the upper edges 35 and 36 of the side walls 26 and 27. Instead, such edges 35 and 36 can abut against the top surface 30, but with recessed portions or portions being cut in the top of the side walls 26 and 27 to form air gaps between the upper side wall edges and the top surface of the upper section 18.

Figure 4:
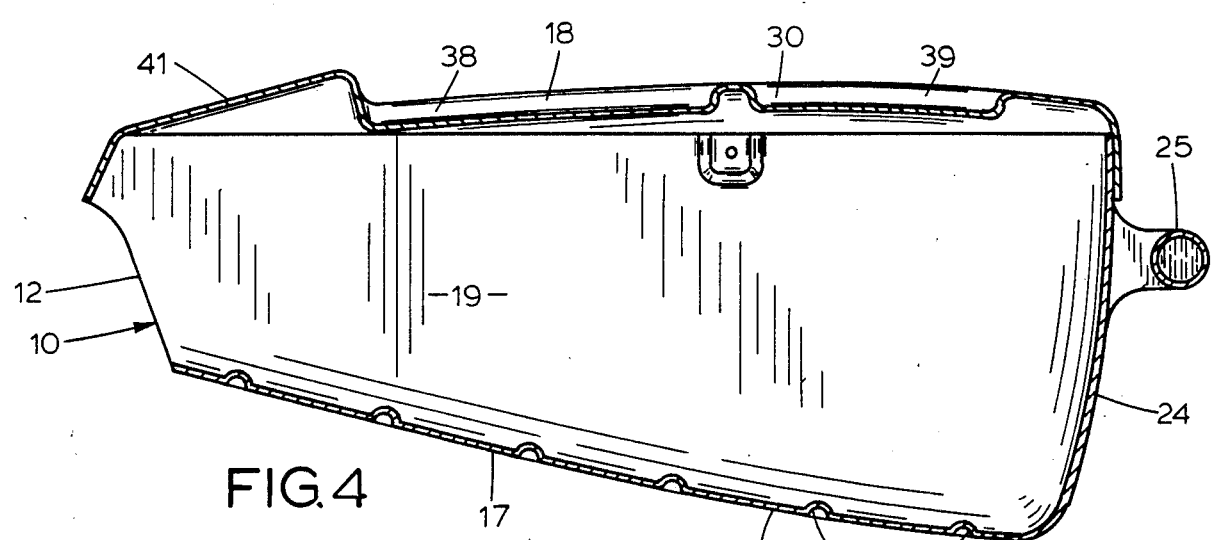
FIG. 4 is a cross sectional view of the grass catcher of FIG. 1 taken along the line 4—4 in FIG. 2.

It should also be noted that the upper section 18 is formed at the catcher inlet end 12 with an upperwardly inclined portion 41 to provide a relatively humped appearance thereto. The purpose of this humped portion 41 is to provide an interior recess, as shown in FIG. 4, for receiving the safety plate 14 in a position that will not impede the flow of grass clippings into the catcher 10.

Thus, the present invention provides a grass catcher that is relatively simplistic in design, can be economically produced and yet provides for the accumulation of grass clippings in an efficient and effective fashion failed to be achieved by prior art devices.

I claim:

1. A removable grass catcher for a rotary lawn mower comprising:
   (a) a relatively rigid housing defining an interior cavity having an inlet opening at one end adapted to be positioned in registry with the discharge opening of said lawn mower for the accumulation of grass clippings in said cavity;
   (b) said housing having a front open end defining said inlet opening, a top wall, bottom wall, rear wall and opposite side walls;
   (c) said top wall of said housing is formed of a major portion that substantially defines the ceiling of said cavity, and at least one downwardly extending peripheral flange along at least one of the rear and side edges of said major portion;
   (d) at least a part of said major portion of said housing top wall and said flange are spaced apart from the upper edge portions of at least one of said rear and side walls of said housing adjacent to the flange of said top wall, with said flange overlapping said upper edge portions to form a passage that provides air gaps therebetween near the top of the housing above the primary flow of grass clippings to serve as an air vent for said housing during the accumulation of grass clippings therein.

2. A grass catcher as recited in claim 1 wherein said housing top wall has at least one downwardly extending flange on each side edge of said major portion to provide an air vent on each side of said housing.

3. A grass catcher as recited in claim 1 wherein said housing top wall flange extends along at least said rear and side walls of said major portion.

4. A grass catcher as recited in claim 3 wherein said housing top wall flange overlaps the rear wall and side walls of said housing whereby said flange is in abutting contact with said rear wall to substantially prevent the passage of air therebetween, and said flange is spaced apart from said side walls to provide side air vents that direct vented air in a downwardly direction.

5. A grass catcher as recited in claim 1 wherein said housing is formed in two parts, with the top wall of said housing formed as one part and the bottom, rear and side walls of said housing formed as the other part.

* * * * *